D. E. Holt,
Corn Planter.
No. 96,323.   Patented Nov. 2, 1869.
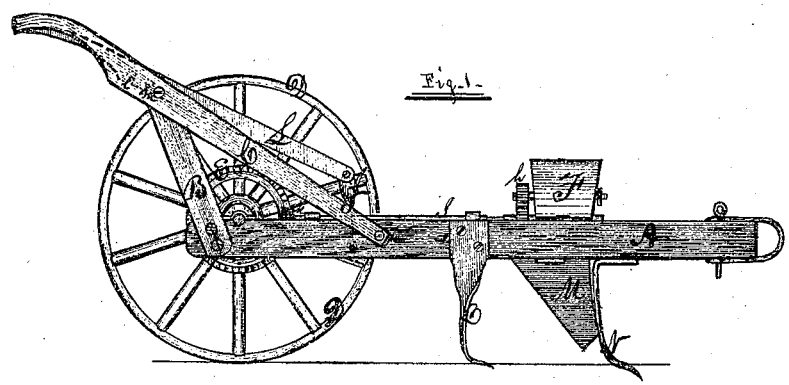
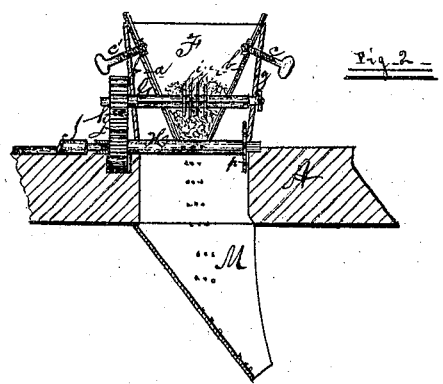
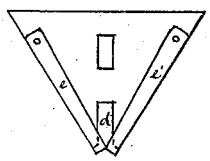
Witnesses:
Rufus R. Rhodes
H. N. Jenkins
Inventor:
D. E. Holt

United States Patent Office.

DAVID E. HOLT, OF WILKINSON COUNTY, MISSISSIPPI.

Letters Patent No. 96,323, dated November 2, 1869.

IMPROVEMENT IN CORN AND COTTON-SEED PLANTERS.

The Schedule referred to in these Letters Patent and making part of the same.

*To all whom it may concern:*

Be it known that I, DAVID E. HOLT, of Wilkinson county, State of Mississippi, have invented a certain new, useful, and improved Combined Cotton - Seed and Corn-Planter; and I do hereby declare the following to be a full, clear, and exact description of the same, reference being had to the annexed drawings, making a part of this specification, in which—

Figure 1 is a side elevation of my said combined planter.

Figure 2, a longitudinal section of the recipient for the seed to be planted, or hopper thereof, in which most of the parts connected therewith are shown; and Figure 3, a detached view of one of the adjustable supplemental sides of the hopper.

My object is to embody, in one machine, the necessary means for converting it into a cotton-seed or corn-planter, as the one or the other may be needed, by a simple adjustment of its parts, and thus to relieve the agriculturist, who plants both cotton and corn, of the heavy expense of purchasing, and having on hand, two distinct machines; and My invention consists of the combination of a seed - carrier, or hopper, having adjustable sides, with a stirrer - shaft, that passes through the same, of novel construction and appointments, for agitating the seed, whether it be cotton-seed or corn, to prevent the packing thereof in said hopper; a cylindrical revolving shaft, which also passes through said hopper, and is perforated around its circumference with a number of shallow cup-like recesses for receiving and dropping a given number of grains of corn at proper or prescribed intervals apart; and a novel arrangement or adjustment of certain mechanical parts, for operating said stirrer and corn-planting cylinder, the whole being secured on a suitable frame, mounted on a single wheel, having a broad tread or tire, to press down the earth on the seed after it has been planted.

But my invention will be better understood by referring to the drawings, in which the same letters denote the same parts at all the figures.

A, B, and C, constitute the frame and handles of the machine, the former being divided at its rear end, to receive the wheel D and a cog-wheel, E, substantially as shown at fig. 1.

There is nothing peculiar about any of these parts, which may be constructed precisely as shown on the drawings, or in any other suitable manner which taste, fancy, or convenience may dictate.

On the beam A is secured a seed-carrier, or hopper, F, which, in all external regards, may be constructed and formed very much in the same way as any ordinary hopper of a seeding-machine. But inside this hopper the construction and arrangement are wholly different, for it will be seen that I introduce, on two of its sides, opposite to each other, supplemental adjustable sides, *a b*, which I secure in any given position therein by means of screw-bolts *c c'*, or some other equivalent mechanical instrumentality. These duplicate supplemental sides, *a b*, have each a vertical cleft, or opening *d*, as shown by fig. 3, in order that they may straddle the stirrer-shaft T, and then pass down to the bottom of the hopper, as shown at fig. 2, and are, moreover, provided with two narrow strips, *e e'*, each, which, being pivoted at their upper ends to the said sides, as shown, afford a means of expanding or diminishing the width thereof, by being moved outwardly or inwardly, as the case may be, and thus of covering the open spaces at their sides, which must necessarily make their appearance in consequence of their adjustment at different angles, to suit the different conditions of cotton-seed and corn-planting, as will hereafter be more clearly seen.

The stirrer-shaft G is secured in proper journals, that are fixed in the sides of the hopper, at its front and rear, the same being marked *g* and *f* on the drawing, in such manner that there is a sufficient projection of it, outside the hopper, toward the rear of the machine, to receive a cog-pinion, *h*, which is permanently fastened on it.

Within the hopper this shaft G is made either square, hexagonal, or octagonal, so as to secure the rotation of the stirrer-arms *i*, whenever it, the said shaft, is rotated, and yet to permit them to be fitted so loosely on said shaft as to be readily slipped or moved longitudinally thereon.

At the bottom of the hopper A, precisely under and in line with shaft G, is adjusted a corn-planting cylinder, H, which also extends outside the hopper, at its rear side, to receive a pinion, *j*, which meshes into pinion *h*, as shown, and still to project several inches beyond said pinion.

In this latter projecting part of the cylinder H is made a hollow sleeve-like recipient for the end of a shaft, I, which, for a few inches back from its extreme end, is reduced in size or diameter, as shown at fig. 2, so as to enter said opening in the end of the said cylinder H. The form of said opening, as well as the reduced termination of the shaft I, may be of any form in its transverse section, which will prevent the latter from turning in the former, or which will cause the rotation of the cylinder H by a rotation of the said shaft I.

The shaft I is secured on the beam A in such manner as to have a limited endwise reciprocating movement, and on its rear end is permanently mounted a pinion, *k*, which gears or takes into the cogs of wheel E whenever the said shaft I is placed in position to drive the cylinder H and the stirrer-shaft G, which said position is shown at fig. 1.

When the parts I have been describing occupy this position they are all connected together, and a forward movement of the machine, on the wheel D, must obviously, by rotating the cog-wheel E, put both the stirrer-shaft G and the cylinder H in motion, through the agency of the intermediate parts, pinion $k$, shaft I, and pinions $j$ and $h$. But the shaft I having an endwise movement, its reduced front, terminating section, or extremity, may be thrown deeper into the recess in cylinder H, by simply moving it forward a few inches, and thus the pinion $k$ will be thrown outside the circle of cogs on wheel E, and hence out of connection with the same, so that the shaft I, as well as the cylinder H and stirrer-shaft G, will cease to move, whether the machine is moving or not.

In order to move the shaft I backward and forward, I fix on it, in any proper manner, an upright standard, J, to which I attach, by a pivot-joint, a hand-lever, L, in which I cut two notches, $l$ $m$, as shown by dotted lines through the rear handle C of the machine, at fig. 1. By moving this lever L forward until the rear notch $l$ comes over a cross-bar between the handles C, the shaft I is thrown forward sufficiently to disconnect the pinion $k$ and cog-wheel E, and hold them out of gear as long as desired. By drawing back the said lever until the front notch $m$ comes over said cross-bar, the connection of pinion $k$ and cog-wheel E is re-established, and all the parts put into gear with each other. A very obvious modification of this arrangement would be so to adjust the parts as to throw the shaft I entirely out of connection with the cylinder H, and the pinion $k$ within the circle of cogs on wheel E, but I do not think this would be as good an arrangement as that I have just described.

A suitable aperture through the beam A, below the hopper F, for the passage of the cotton-seed or corn, as the case might be, leads into a shoe, M, which is placed close behind a trench-opening plow, N, in such manner that the seed will fall directly into the centre of the trench made by said plow.

On each side of the beam A, a little behind shoe M, a covering-plow, O, of any approved pattern, is placed, substantially as shown at fig. 1.

When the machine is to be used as a cotton-seed planter, the supplemental interior side $b$ of the hopper F is withdrawn, and the opposite side $a$ is moved, at its lower end, close up to the cotton-seed-delivering wheel $p$, so as to completely cover the corn-delivering cup-formed recesses in cylinder H, and then the strips $e$ $e'$ are moved outwardly, so as to cover the openings which are necessarily developed by the change of the angle at which said side $a$ has been placed. This adjustment requires that the stirrers, or agitating-arms $i$, shall be moved on shaft G, care being taken to preserve proper intervals of space between them, until one of them is brought directly over the delivering-wheel $p$. When, on the contrary, corn is to be planted, both the supplemental sides $a$ and $b$ are used, the adjustment of them being substantially as shown at fig. 2, which, it will be perceived, completely covers over the cotton-seed-delivering wheel $p$, and thus prevents any part of the corn from coming within its action.

Having thus described my invention,

What I claim, and desire to secure by Letters Patent is—

1. The supplemental adjustable sides $a$ $b$ with the hopper F, when the latter is provided with stirrer-shaft G and cylinder H, substantially as herein described, for the purpose set forth.

2. The combination of the hopper F, when provided with supplemental adjustable sides $a$ $b$, with the shaft I, and its adjuncts and the gearing connected therewith, when all the parts are arranged and operate substantially as herein described, for the purpose set forth.

D. E. HOLT.

Witnesses:
 RUFUS R. RHODES,
 H. N. JENKINS.